(12) United States Patent
Hall et al.

(10) Patent No.: US 8,424,954 B2
(45) Date of Patent: Apr. 23, 2013

(54) VEHICLE GRAB HANDLE ASSEMBLY

(75) Inventors: Ian Brewster Hall, Kensington, MD (US); John Pinkerton, Canton, MI (US); Sarah Certeza, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/078,326

(22) Filed: Apr. 1, 2011

(65) Prior Publication Data
US 2012/0248815 A1 Oct. 4, 2012

(51) Int. Cl.
*B60J 9/00* (2006.01)

(52) U.S. Cl.
USPC .......................................................... 296/153

(58) Field of Classification Search ................ 296/1.09, 296/153, 152, 146.7, 187.05
See application file for complete search history.

(56) References Cited

U.S. PATENT DOCUMENTS

| | | | |
|---|---|---|---|
| 2,922,674 A * | 1/1960 | Hollerbach | 296/153 |
| 4,783,114 A * | 11/1988 | Welch | 296/153 |
| 5,527,084 A * | 6/1996 | Scherf | 296/153 |
| 6,248,205 B1 * | 6/2001 | Scheidmantel et al. | 156/309.6 |
| 6,428,089 B1 | 8/2002 | Noda | |
| 6,431,640 B1 | 8/2002 | Sakuma et al. | |
| 6,612,222 B2 | 9/2003 | Saito et al. | |
| 6,647,594 B1 | 11/2003 | Deb et al. | |
| 6,829,812 B2 | 12/2004 | Ozios et al. | |
| 6,869,119 B2 | 3/2005 | Ito et al. | |
| 6,893,077 B1 * | 5/2005 | DeJongh | 296/187.05 |
| 6,983,967 B2 | 1/2006 | Scheidmantal et al. | |
| 7,070,221 B2 * | 7/2006 | Cowelchuk et al. | 296/39.1 |
| 7,789,455 B2 * | 9/2010 | Hall et al. | 296/187.05 |
| 7,794,010 B2 * | 9/2010 | Saida et al. | 296/153 |
| 7,828,388 B2 * | 11/2010 | Thomas | 297/411.21 |
| 8,123,280 B2 * | 2/2012 | Hori et al. | 296/153 |
| 8,172,311 B2 * | 5/2012 | Hughes et al. | 296/187.05 |

* cited by examiner

*Primary Examiner* — H Gutman
(74) *Attorney, Agent, or Firm* — Frank MacKenzie; Brooks Kushman P.C.

(57) ABSTRACT

A vehicle having a handle assembly with a lateral wall adapted to be mounted to a vehicle interior door trim is provided. The lateral wall has a top surface and a distal end offset from the top surface. A weakened portion is formed into the lateral wall for reducing the lateral stiffness of the handle assembly. The weakened portion is disposed adjacent the top surface and extends to the door trim to form a generally continuous top appearance surface. Upon a lateral force, the handle deforms along the weakened portion and the lateral wall rotates about the distal end, thereby promoting buckling in order to absorb energy and minimize the risk of passenger injury.

18 Claims, 4 Drawing Sheets

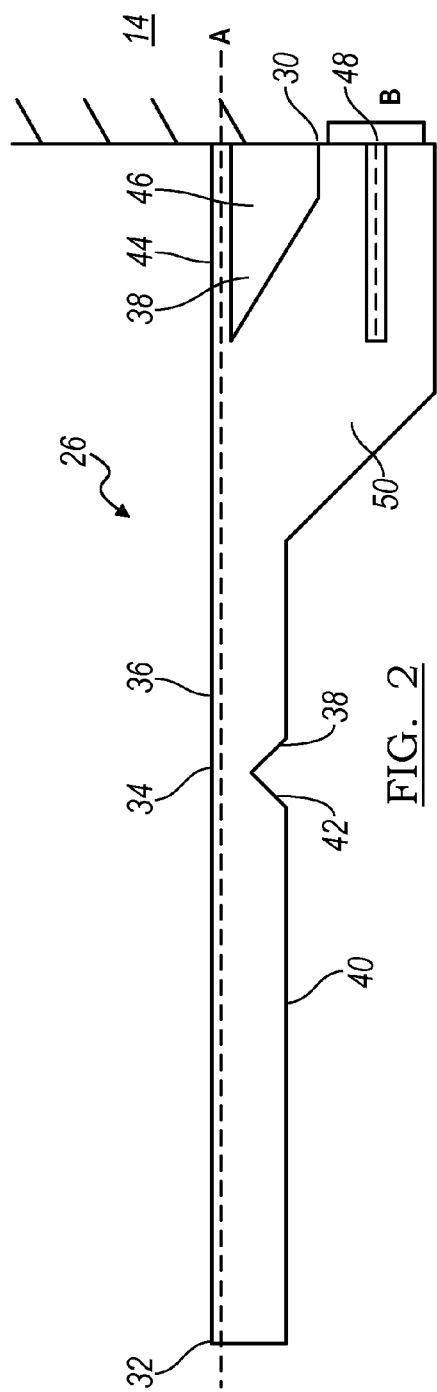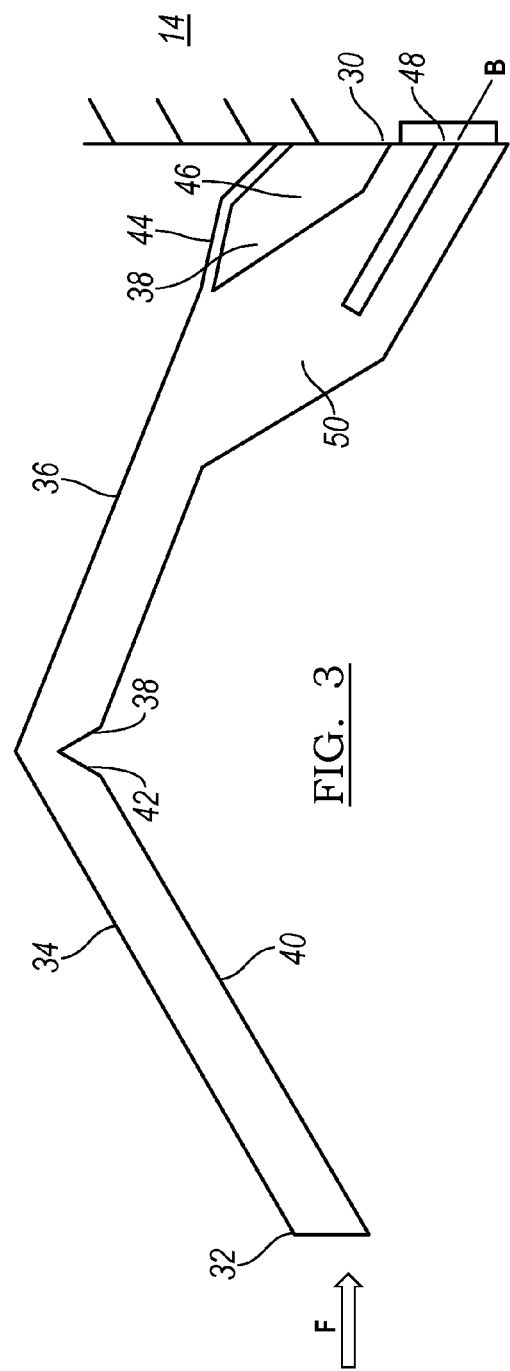

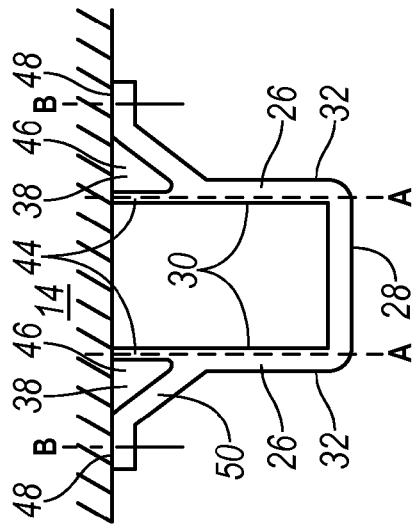
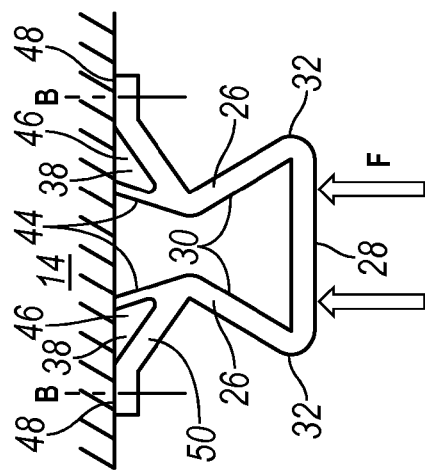
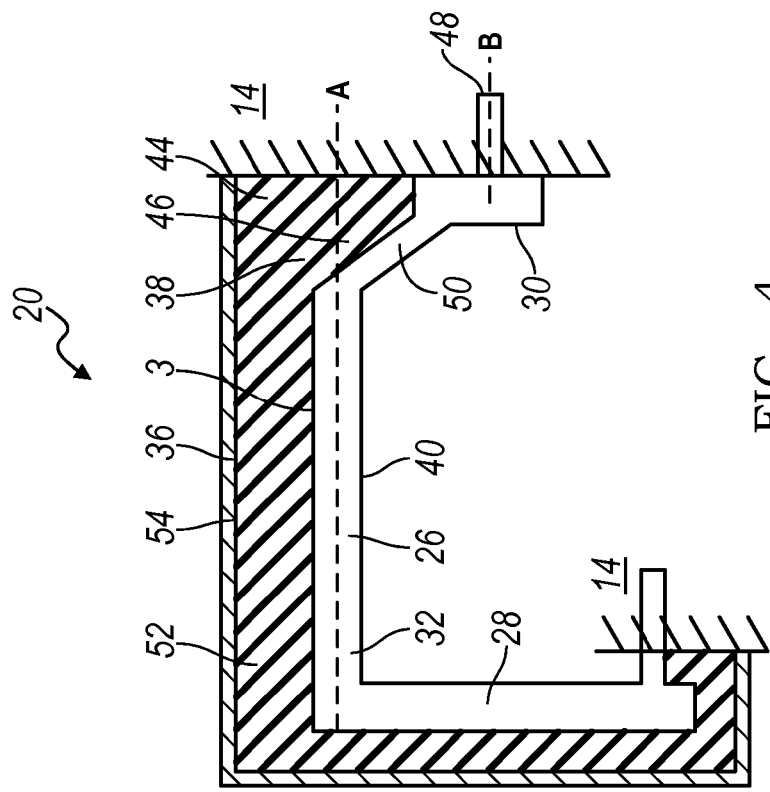

US 8,424,954 B2

VEHICLE GRAB HANDLE ASSEMBLY

TECHNICAL FIELD

Various embodiments relate to grab handle assemblies for passenger vehicles.

BACKGROUND

Doors for automotive vehicles typically include a door frame and an interior trim panel for covering the interior surface of the door frame. The interior trim panel usually includes an armrest with a grab handle mounted to the interior trim. The armrest must be ridged enough to support the arm of an occupant and the force required to open and close the door with the grab handle. However, the ridged arm rest maybe a safety issue were the armrest and grab handle are located in a side impact zone of the occupant. Therefore, it is desirable to have an armrest with grab handle that absorbs energy in order to prevent passenger injury during a side impact collision. Also, since the armrest and grab handle are visible features of the interior trim, style and appearance surfaces must be maintained while incorporating energy absorption characteristics.

SUMMARY

At least one embodiment provides a vehicle handle assembly with a lateral wall adapted to be mounted to a vehicle interior door trim. The lateral wall has a top surface and a distal end offset from the top surface. A weakened portion is formed into the lateral wall for reducing the lateral stiffness of the handle assembly. The weakened portion is disposed adjacent the top surface and extends to the door trim to form a generally continuous top appearance surface. Upon a lateral force, the handle deforms along the weakened portion and the lateral wall rotates about the distal end, thereby promoting buckling in order to absorb energy, reduce intrusion in to the occupant compartment, and prevent passenger injury.

Another embodiment provides the vehicle handle assembly with a grab wall portion. The grab wall portion may be connected adjacent to a proximal end of the lateral wall.

Yet another embodiment provides the vehicle handle assembly with a pair of lateral walls offset from each other. The pair of lateral walls may be connected by the grab wall portion.

A further embodiment orients the lateral wall such that the distal end is offset from the top surface in a vertical direction.

Another embodiment orients the lateral wall such that the distal end is offset from the top surface in a horizontal direction.

A further embodiment provides the lateral wall with at least one notch disposed on a bottom surface, such that the lateral wall buckles adjacent the notch during side vehicle impact.

An even further embodiment provides that the lateral wall and weakened portion define a top appearance surface which is generally convex in order to promote buckling during side vehicle impact.

Another embodiment provides that the lateral wall and weakened portion form a substrate that is covered with a trim material along the top appearance surface.

Yet another embodiment provides that the weakened portion is formed of foam.

At least one embodiment provides a vehicle handle assembly with at least one lateral wall having a top surface and a distal end for mounting the handle to a vehicle interior door trim. The lateral wall has a cavity portion formed along the top surface. A cover portion extends across the cavity to form a generally continuous top appearance surface. Upon a lateral force applied along the lateral wall during side vehicle impact, the cover portion is deformed thereby displacing the lateral wall in order to absorb energy and prevent passenger injury.

Another embodiment provides that the cover portion is relatively thin compared to the lateral wall and thereby does not provide structural support.

Yet another embodiment provides that the lateral wall has an angled wall portion which forms the cavity.

A further embodiment provides that the angled portion is angled vertically so that the distal end is offset from the top surface in a vertical direction.

Another embodiment provides that the angled portion is angled horizontally so that the distal end is offset from the top surface in a horizontal direction.

A further embodiment provides the lateral wall with a pair of lateral walls offset from each other. The pair of lateral walls may be connected by a grab wall portion adjacent a proximal end of the lateral walls.

An even further embodiment provides the lateral wall with at least one notch disposed on a bottom surface, such that the lateral wall buckles adjacent the notch during side vehicle impact.

Another embodiment provides that the lateral wall and cover portion are defined along a first axis. The distal end may be attached to the vehicle door trim to define a fulcrum point which is offset from the first axis.

Yet another embodiment provides that the lateral wall and cover portion collectively form a substrate that is covered with a trim material along the top appearance surface.

At least one embodiment provides a vehicle handle with at least one lateral wall having a top surface and a distal end adapted for mounting the handle to a vehicle interior door. The distal end may be offset from the top surface so that when a lateral force is applied, the lateral wall rotates about the distal end and promotes buckling in order to absorb energy and prevent passenger injury.

Another embodiment provides that the offset distal end forms a discontinuity along the top surface. The handle assembly has a façade portion adjacent the top surface that covers the discontinuity in order to form a continuous appearance surface.

BRIEF DESCRIPTION OF THE DRAWINGS

FIG. 2 is a cross sectional view of section 2-2 of the interior door trim of FIG. 1;

FIG. 3 is a cross sectional view of section 2-2 of the interior door trim of FIG. 1 during a vehicle side impact;

FIG. 4 is a section view of an interior door trim panel according to an embodiment of the invention;

FIG. 5 is a top section view of a component of the interior door trim according to one embodiment of the invention;

FIG. 6 is a component of the interior door trim according to one embodiment of the invention during a side vehicle impact.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
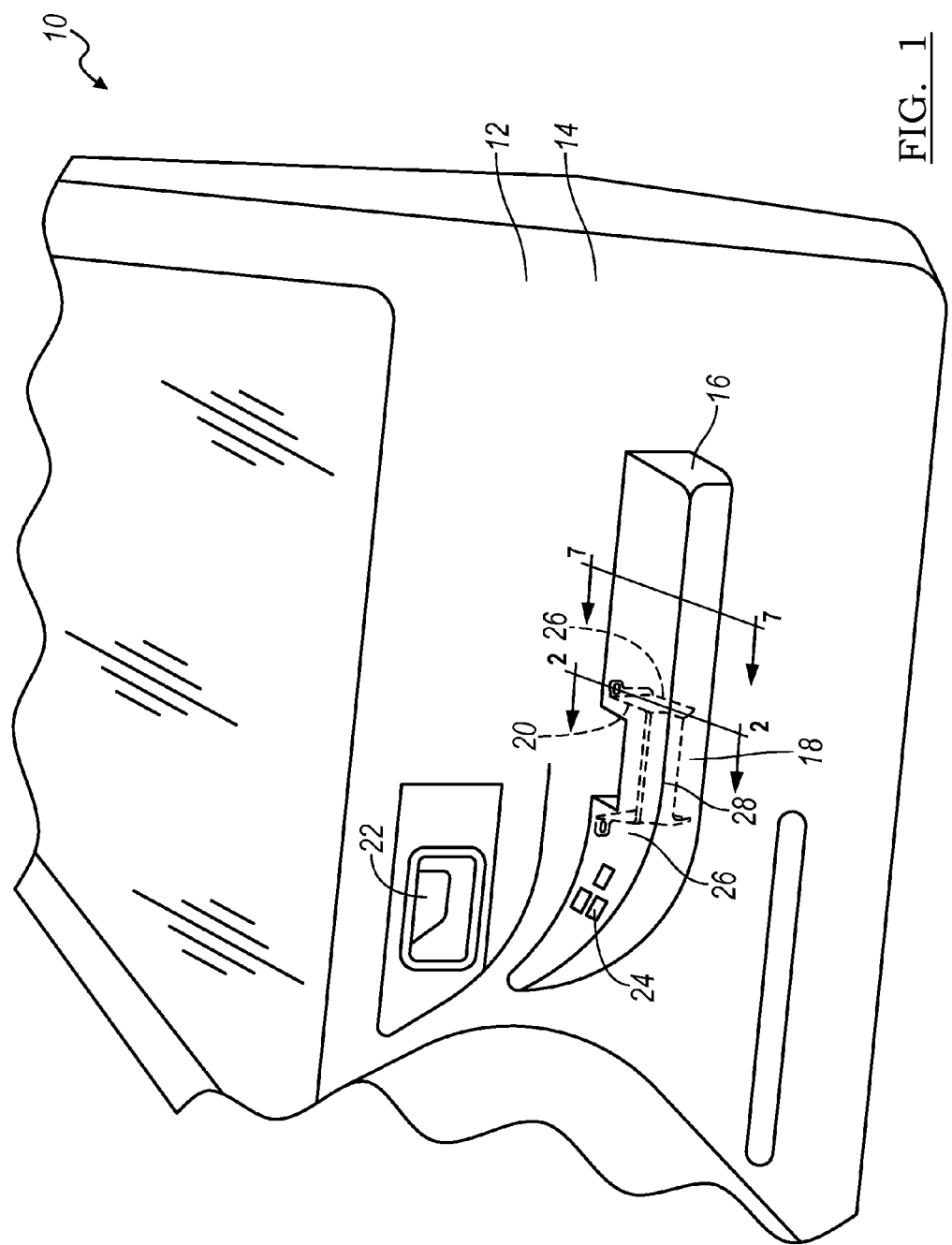
FIG. 1 is a perspective view of the interior trim of a vehicle door according to an embodiment of the invention.

FIG. 1 illustrates a door 10 of an automotive vehicle. The door 10 may include an interior door trim assembly 12 which includes an inner door trim panel 14. The trim panel 14 may be formed of conventional materials and covered in trim material such as fabric or vinyl or other suitable materials.

An armrest 16 may be mounted to the inner trim panel 14. The interior door trim assembly may also include a latch assembly 22 which opens and closes the door 10 as well as control features such as buttons 24 to open and close the window and lock and unlock the door 10. The armrest 16, while providing support for a passenger to rest their arm, may also include other functional features such as the latch 22 and control buttons 24.

The armrest 16 may also include a grab handle 18 which may be gripped by a passenger. A passenger may use the grab handle 18 to push the door 10 open or pull the door 10 closed. In order to provide enough structural support and rigidity in the armrest 16, the grab handle 18 may include a grab handle frame 20.

Referring to FIG. 1, the grab handle frame 20 may include a lateral wall 26 which is mounted to the trim panel 14. Additionally, as illustrated in FIG. 1, the grab handle frame 20 may be generally U-shaped and include a pair of lateral walls 26. The lateral walls 26 may be offset or space apart from each other and connected with a grab wall 28 to form the U-shaped frame 20.

Referring now to FIGS. 2-3, FIGS. 2-3 illustrate a cross-sectional view of a lateral wall 26 of the grab handle frame 20 according to one embodiment of the invention. The lateral wall 26 may include a distal end 30 adapted for mounting to the inner trim panel 14. As such, the grab wall portion 28 may connect the pair of lateral walls 26 along a proximal end 32 of the lateral wall 26.

The lateral wall 26 may have a top surface 34 which extends to the inner trim panel 14. The top surface 34 of the lateral wall 26 maybe a generally continuous top appearance surface 36, or A-class surface, which corresponds to an appearance surface of the armrest 16.

In order to absorb energy during a side impact, the lateral wall 26 may include a weakened portion 38 for reducing the lateral stiffness of the grab handle assembly 18. The weakened portion 38 in the lateral wall 26 allows the grab handle portion 18 to meet safety deflection requirement during a vehicle side impact collision. The weakened portion 38 allows the grab handle frame 20 to deflect or buckle during a side impact force F applied in the lateral direction. While the grab handle frame 20 provides enough rigidity and stiffness for everyday use, the weakened portion 38 in the lateral wall 26 promotes buckling or defection of the grab handle 18 or armrest 16 in side impacts where the force maybe as much as 1000N or more.

The armrest 16 and grab handle must still meet appearance standards, even while incorporating a weakened portion 38. Traditional techniques for promoting deflection of buckling may include adding bend lines in the trim or bend lines in the grab handle frame 20. However, this may create discontinuity in the A-surface, or appearance surface, of the armrest 16. Discontinuities in the armrest 16 are unacceptable by appearance standards. Where the grab handle frame 20 may be overmolded in plastic, bend lines in the grab handle frame 20 would create physical streaking or sink marks on the A-surface.

In order to conceal the weakened portions 38 and maintain the appearance surface standards, the weakened portion 38 maybe formed adjacent to a bottom surface 40 of the lateral wall 26. The bottom surface 40 may not be an A-class surface since it is generally not visible by the passengers.

In one embodiment, a weakened portion 38 may be formed as a notch 42. The notch may be formed as a groove or a v-shaped channel and may only extend a few millimeters from the bottom surface 40. A notch 42 may promote bending and buckling of the grab handle frame 20 at the notch 42 upon a side impact force F.

The weakened portion 38 may also be formed adjacent to the top surface 34 of the lateral wall 26. In order to prevent any defect in the appearance surface or A-class surface, the weakened portion 38 may include a façade or cover portion 44 to form a generally continuous top appearance surface 36 of the lateral wall 26. In this embodiment, the weakened portion 38 maybe formed as a cavity 46 or an area of reduced material thickness or any other means to create a weakened area.

The cover portion or façade 44 may be non-structural and may not provide additional rigidity or stiffness to the lateral wall 26. The weakened portion 38 including the cover portion or façade 44 may be integrally formed with the lateral wall 26 to form a substrate that may be over molded or covered in trim material along the top appearance surface 36 in order to form the armrest assembly 16.

In another embodiment, a weakened portion 38 may be formed when a mounting location 48 is offset from the top surface 34. The mounting location 48 may be offset a distance from a major axis A formed by the lateral wall 26. The mounting location 48 may be offset from the major axis A in the horizontal direction or the vertical direction.

Alternatively, the weakened portion 38 may be formed of a material different than the lateral wall 26. The lateral wall 26 may be a metal component that may be stamped or formed in any other suitable means. For example, where the grab handle frame 20 and lateral wall 26 are made of stamped metal, the façade or cover portion 44 may be formed of foam. In another embodiment, where the weakened portion 38 includes a cavity 46, the cavity 46 may be filled with foam.

The weakened portion 38 may be formed adjacent the distal end 30 of the lateral wall 26 in order to change the end condition of the load path F and promote buckling. For example, the cavity 46 may be formed adjacent the distal end 30 so that the cavity 46 is formed between the lateral wall 26 and the inner trim panel 14. The cavity 46 may be formed with by an angled portion 50 in the lateral wall 26. The angled portion 50 may be angled vertically from the top surface 34. The angled portion 50 may be formed along the distal end 30 so that the mounting location 48 is offset from the top surface 34. The cavity 46 and offset mounting location 48 change the end condition of the load path F when compared to a linear beam-like lateral wall 26.

Alternatively, as illustrated in FIGS. 5-6, the lateral wall 26 may include an angled portion 50 that is angled in the horizontal direction so that the distal end 30 and mounting location 48 are offset from the top surface 34 in a horizontal direction. Where a cavity 46 is formed along the top surface 34 of the lateral wall 26, a façade or cover portion 44 may extend across the cavity 46 to form a generally continuous top appearance surface 36.

The distal end 30 of the lateral wall 26 may be adapted to be connected to the interior door trim panel 14 at a mounting location 48. The distal end 30 maybe attached to the door trim panel 14 with heat stake or a threaded fastener or any other suitable fastening member.

The top surface of the lateral wall 26 and the façade or cover portion 44 may form a major axis A of the lateral wall. When the mounting location 48 is offset from the major access A of the lateral wall 26, this changes the end condition of the load path F and induces early rotation about the distal end 30 of the lateral wall 26.

By having the distal end 30 fastened to the interior trim panel 14 at an offset mounting location 48, this creates a fulcrum point B of the lateral wall 26 at the offset mounting location 48. The lateral wall 26 may rotate about the fulcrum point B which is offset from the major axis A. Rotation about the offset fulcrum point B allows the grab handle frame 20 to buckle more quickly in a side impact collision where force F is applied in the lateral direction.

As illustrated in FIG. 3, when the lateral force F is applied to the lateral wall 26, the lateral wall 26 may rotate about the fulcrum B at the mounting location 48 where the lateral wall 26 is attached to the trim panel 14. As the lateral wall 26 rotates it is displaced in the lateral direction and may also buckle along the notched portion 42, for example. The non-structural façade or cover portion 44 may also buckle as the lateral wall 26 rotates about the offset mounting location 48, thereby further displacing the lateral wall 26 in the lateral direction.

Referring back to FIG. 1, FIG. 1 illustrates a grab handle frame 20 having a pair of lateral walls 26 offset from each other, where the pair of lateral walls 26 are connected by a grab wall portion 28. In this configuration the pair of lateral walls 26 maybe generally parallel to each other and the grab wall portion 28 maybe generally parallel to the trim panel wall 14. The grab wall portion maybe connected between the lateral walls 26 at the proximal end 32 of the later walls, where the lateral wall 26 is attached to the trim panel 14 along the distal end 30.

Referring now to FIGS. 4-6, FIGS. 4-6 illustrate alternate configurations of the grab handle frame 20. FIG. 4 illustrates an alternate embodiment of the present invention where the grab handle frame 20 may include a single lateral wall 26 connected to a grab handle wall 28. In this configuration, the lateral wall 26 maybe mounted to a trim panel 14 while the grab handle wall 28 is also mounted to a trim panel 14 or map pocket cover (not shown) or any other trim feature located along the interior door trim assembly 12 of the vehicle door 10.

The grab handle frame 20 maybe covered or overmolded with foam cushioning 52 and covered with trim fabric or vinyl 54 to provide a softer armrest 16 upon lost lateral impact. In this case the weakened portion 38 or the cavity 46 is concealed by foam 52, which may fill in the cavity portion 46 formed along the distal end of the lateral wall by the offset distal end 30.

FIGS. 5 and 6 illustrate an alternate embodiment grab handle frame 20 where the distal end 30 of the lateral wall 26 is offset in the horizontal direction. FIGS. 5 and 6 are a cross section of a grab handle frame 20 shown from a top view. The proximal end of the lateral walls 26 are connected by a grab handle wall 28. The distal end 30 of the lateral wall 26 includes an angled wall portion 50, which is angled outward in the horizontal direction from the lateral wall 26 so that the distal end 30 is offset outward of the lateral wall 26 and grab handle wall 28. The grab handle frame 20 may be formed with a cover or non-structural façade portion 44, which may extend generally parallel to the proximal end 32 of the lateral wall 26 towards the trim panel 14. The cover or façade portion 44 may form a general continuous top appearance surface 36 from the proximal end 32 of the lateral wall 26 all the way to the trim panel 14.

FIG. 6 illustrates how the grab handle frame 20 illustrated in FIG. 5 may buckle upon application of a lateral force F during a side impact collision. As shown in FIG. 6, the grab handle frame 20 may rotate about a fulcrum point B at a mounting location 48 along the offset distal end 30 of the lateral walls 26. The lateral walls 26 may buckle along the intersection of the angled wall portion 50. The buckling and rotation may displace the grab handle frame 20 in order to absorb energy and minimize passenger injury during a side impact.

Figure 7:
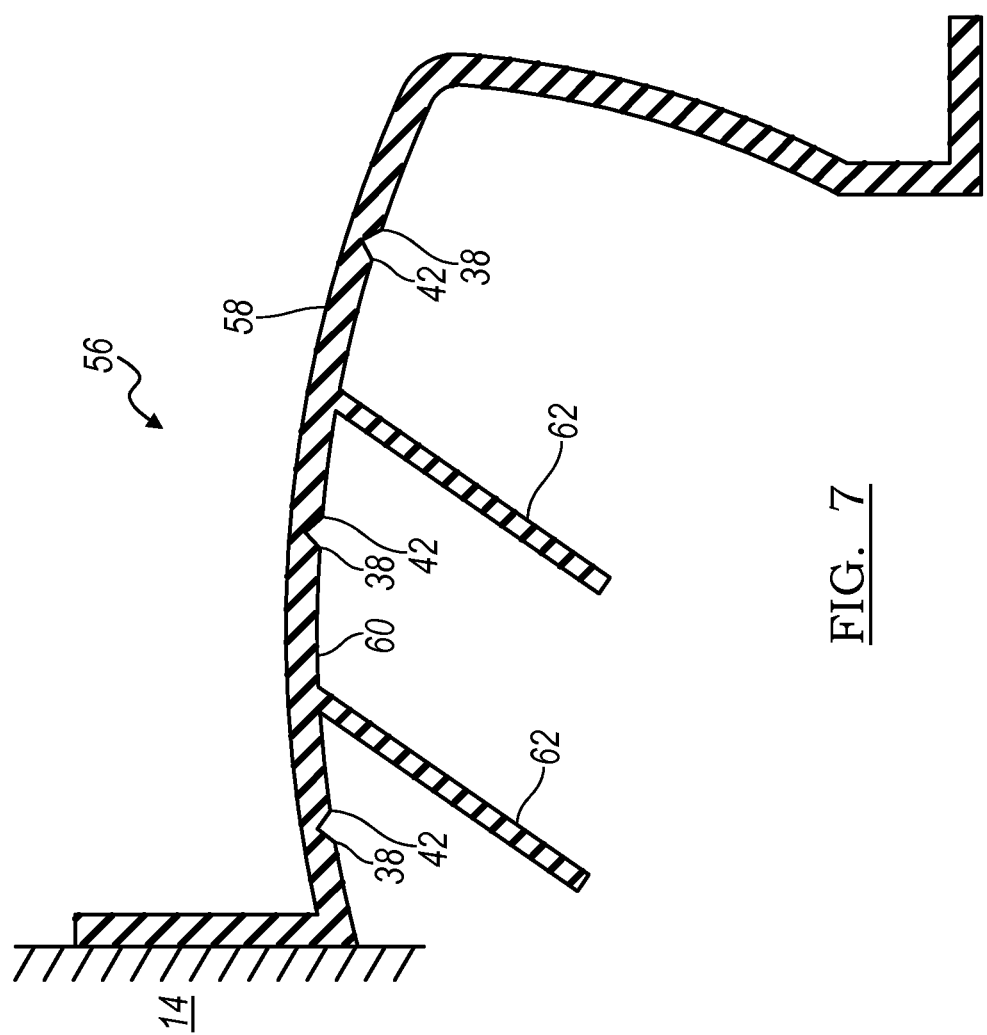
FIG. 7 is a cross sectional view of the interior door trim along section 7-7 of FIG. 1.

Referring now to FIG. 7, FIG. 7 illustrates a cross sectional view along section 7-7 of FIG. 1. In addition to the grab handle frame 20 the armrest 16 may include an inner shell 56 that provides structural support and enables the armrest 16 to be mounted to the door 10 as well as providing structural support for any foam 52 or overmolding of a finished armrest assembly 16. The inner shell 56 may also be adapted to be displaced in a side impact in order to reduce passenger injury.

The inner shell 56 may have a generally convex top appearance surface 58 in order to promote buckling during side impact. The inner shell 56 may also include weakened portions 38 such as notches 42 formed along a bottom surface 60 to promote further buckling and displacement during a vehicle side impact. Additionally, the inner shell 56 may include ribs 62 for vertical load stiffness while still allowing displacement in the lateral direction during a side impact force. It is also contemplated that grab handle frame 20 as described in FIGS. 2-6 may further include these features such as the convex top appearance surface 58 and ribs 62.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle handle assembly comprising:
  a lateral wall adapted for being mounted to a vehicle interior door trim, the lateral wall having a top surface and a distal end offset from the top surface; and a weakened portion formed into the lateral wall for reducing lateral stiffness of the handle assembly, the weakened portion disposed adjacent the distal end and extending to the door trim,
  wherein the lateral wall forms a generally continuous top appearance surface along the weakened portion,
  wherein the handle deforms along the weakened portion and the lateral wall rotates about the distal end when a lateral force is applied to the lateral wall, thereby promoting buckling in order to absorb energy, reduce intrusion in to the occupant compartment, and minimize passenger injury.

2. The vehicle handle assembly of claim 1 further comprising a grab wall portion connected adjacent a proximal end of the lateral wall, the proximal end being opposite the distal end, the grab wall portion being arranged generally perpendicular from the lateral wall.

3. The vehicle handle assembly of claim 2 further comprising a pair of lateral walls offset from each other, the pair of lateral walls connected by the grab wall portion.

4. The vehicle handle assembly of claim 1 wherein the distal end is offset from the top surface in a vertical direction.

5. The vehicle handle assembly of claim 1 wherein the distal end is offset from the top surface in a horizontal direction.

6. The vehicle handle assembly of claim 1 wherein the weakened portion further includes at least one notch disposed on a bottom surface, such that the lateral wall buckles adjacent the notch during side vehicle impact.

7. The vehicle handle assembly of claim 1 wherein the top surface which is generally convex in order to promote buckling during side vehicle impact.

8. The vehicle handle assembly of claim 1 wherein the lateral wall and weakened portion form a substrate that is covered with a trim material along the top appearance surface.

9. The vehicle handle assembly of claim 1 wherein the distal end includes a mounting location for mounting to the interior door trim, a mounting axis being offset and parallel from a central lateral axis of the lateral wall, wherein the weakened portion is formed in the lateral wall between the mounting axis and the central lateral axis.

10. A vehicle handle assembly comprising:
at least one lateral wall having a top surface and a distal end adapted for being mounted to a vehicle interior door trim, the lateral wall having a cavity portion formed adjacent the distal end and extending to the interior door trim; and
a cover portion extending across the cavity portion to form a generally continuous top appearance surface,
wherein upon a lateral force applied along the lateral wall during side vehicle impact, the cover portion is deformed thereby displacing the lateral wall in order to absorb energy and prevent passenger injury,
wherein the lateral wall and cover portion collectively form a substrate that is covered with a trim material along the top appearance surface.

11. The vehicle handle assembly of claim 10 wherein the cover portion is relatively thin compared to the lateral wall and thereby does not provide structural support.

12. The vehicle handle assembly of claim 10 wherein the lateral wall further includes an angled wall portion which forms the cavity portion.

13. The vehicle handle assembly of claim 12 wherein the angled portion is angled vertically so that the distal end is offset from the top surface in a vertical direction.

14. The vehicle handle assembly of claim 12 wherein the angled portion is angled horizontally so that the distal end is offset from the top surface in a horizontal direction.

15. The vehicle handle assembly of claim 10 wherein the at least one lateral wall further comprises a pair of lateral walls offset from each other, the pair of lateral walls connected by a grab wall portion adjacent a proximal end of the lateral walls.

16. The vehicle handle assembly of claim 10 wherein the lateral wall further includes at least one notch disposed on a bottom surface, such that the lateral wall buckles adjacent the notch during side vehicle impact.

17. A vehicle handle assembly comprising:
at least one lateral wall having a top surface and a distal end adapted for being mounted to a vehicle interior door trim, the lateral wall having a cavity portion formed adjacent the distal end and extending to the interior door trim; and
a cover portion extending across the cavity portion to form a generally continuous top appearance surface,
wherein upon a lateral force applied along the lateral wall during side vehicle impact, the cover portion is deformed thereby displacing the lateral wall in order to absorb energy and prevent passenger injury,
wherein the lateral wall and cover portion are defined along a central lateral axis and the distal end is attached to the vehicle door trim at a fulcrum point having a mounting axis which is offset and parallel from the central lateral axis, wherein the cavity portion is formed in the lateral wall between the mounting axis and the central lateral axis.

18. A vehicle handle assembly comprising:
at least one lateral wall having a top surface and a mounting location disposed at a distal end of the lateral wall adapted for being mounted to a vehicle interior door, the distal end is offset from the top surface and forms a discontinuity along the top surface, and a façade portion adjacent the top surface and covering the discontinuity in order to form a continuous appearance surface being generally planar, the top surface and façade portion thereby being generally coplanar so that when a lateral force is applied, the lateral wall rotates about the distal end and promotes buckling in order to absorb energy and minimize passenger injury.

* * * * *